United States Patent
Kandoi et al.

(10) Patent No.: US 11,436,524 B2
(45) Date of Patent: Sep. 6, 2022

(54) HOSTING MACHINE LEARNING MODELS

(71) Applicant: Amazon Technologies, Inc., Seattle, WA (US)

(72) Inventors: Nikhil Kandoi, Seattle, WA (US); Ganesh Kumar Gella, Redmond, WA (US); Rama Krishna Sandeep Pokkunuri, Redmond, WA (US); Sudhakar Rao Puvvadi, Bellevue, WA (US); Stefano Stefani, Issaquah, WA (US); Kalpesh N. Sutaria, Seattle, WA (US); Enrico Sartorello, Berlin (DE); Tania Khattar, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 992 days.

(21) Appl. No.: 16/146,331

(22) Filed: Sep. 28, 2018

(65) Prior Publication Data

US 2020/0104750 A1    Apr. 2, 2020

(51) Int. Cl.
| | |
|---|---|
| *G06N 20/00* | (2019.01) |
| *G06N 5/04* | (2006.01) |
| *G06F 9/50* | (2006.01) |
| *H04L 67/1001* | (2022.01) |

(52) U.S. Cl.
CPC ............ *G06N 20/00* (2019.01); *G06F 9/505* (2013.01); *G06F 9/5055* (2013.01); *G06N 5/04* (2013.01); *H04L 67/1002* (2013.01)

(58) Field of Classification Search
None
See application file for complete search history.

(56) References Cited

U.S. PATENT DOCUMENTS

| | | | | |
|---|---|---|---|---|
| 5,553,235 A | * | 9/1996 | Chen ................... | G06F 11/3414 |
| | | | | 714/E11.193 |
| 6,430,618 B1 | * | 8/2002 | Karger ................ | H04L 67/1023 |
| | | | | 709/225 |
| 6,438,576 B1 | * | 8/2002 | Huang .................. | G06F 9/5072 |
| | | | | 709/201 |

(Continued)

OTHER PUBLICATIONS

Non-Final Office Action, U.S. Appl. No. 16/146,295, dated Oct. 28, 2021, 39 pages.

(Continued)

*Primary Examiner* — Adam Lee
(74) *Attorney, Agent, or Firm* — Nicholson De Vos Webster & Elliott LLP

(57) ABSTRACT

Techniques for hosting machine learning models are described. In some instances, a method of receiving a request to perform an inference using a particular machine learning model; determining a group of hosts to route the request to, the group of hosts to host a plurality of machine learning models including the particular machine learning model; determining a path to the determined group of hosts; determining a particular host of the group of hosts to perform an analysis of the request based on the determined path, the particular host having the particular machine learning model in memory; routing the request to the particular host of the group of hosts; performing inference on the request using the particular host; and providing a result of the inference to a requester is performed.

20 Claims, 18 Drawing Sheets

(56) References Cited

U.S. PATENT DOCUMENTS

| | | | | |
|---|---|---|---|---|
| 8,880,657 B1* | 11/2014 | Angrish | G06F 9/5072 | 709/224 |
| 9,466,051 B1* | 10/2016 | Roth | G06F 21/6218 | |
| 9,678,773 B1 | 6/2017 | Wagner et al. | | |
| 10,409,642 B1* | 9/2019 | Tang | G06F 9/5005 | |
| 10,558,579 B1* | 2/2020 | Goli | G06F 12/123 | |
| 10,713,589 B1* | 7/2020 | Zarandioon | G06N 20/00 | |
| 10,817,670 B2 | 10/2020 | Galitsky | | |
| 11,050,787 B1* | 6/2021 | Sharifi Mehr | G06F 9/45558 | |
| 2002/0042828 A1* | 4/2002 | Peiffer | H04L 67/101 | 709/227 |
| 2004/0139167 A1* | 7/2004 | Edsall | H04L 67/1008 | 709/212 |
| 2007/0294387 A1* | 12/2007 | Martin | H04L 29/06 | 709/224 |
| 2008/0263324 A1* | 10/2008 | Sutardja | G06F 9/4856 | 712/43 |
| 2009/0178045 A1* | 7/2009 | Gupta | G06F 9/5016 | 718/103 |
| 2009/0327079 A1* | 12/2009 | Parker | G06Q 30/02 | 705/14.66 |
| 2010/0242025 A1* | 9/2010 | Yamazaki | G06F 11/3476 | 711/E12.001 |
| 2010/0332657 A1* | 12/2010 | Elyashev | H04L 67/1002 | 709/226 |
| 2013/0282630 A1* | 10/2013 | Attenberg | G06N 5/02 | 706/12 |
| 2013/0332608 A1* | 12/2013 | Shiga | G06F 9/5088 | 709/226 |
| 2013/0346532 A1* | 12/2013 | D'Amato | G06F 3/0617 | 709/213 |
| 2014/0068022 A1* | 3/2014 | Kshirsagar | H04L 41/0813 | 709/220 |
| 2014/0164619 A1* | 6/2014 | Zhu | H04L 63/0227 | 709/226 |
| 2015/0040127 A1* | 2/2015 | Dippenaar | G06F 9/5088 | 718/1 |
| 2015/0222515 A1* | 8/2015 | Mimura | H04L 43/0876 | 709/224 |
| 2015/0277951 A1* | 10/2015 | Sundararaman | G06F 12/0802 | 718/1 |
| 2015/0317169 A1* | 11/2015 | Sinha | H04L 49/254 | 713/2 |
| 2015/0363219 A1* | 12/2015 | Kasturi | H04L 41/5058 | 718/1 |
| 2016/0019074 A1* | 1/2016 | Nahir | G06F 9/5077 | 718/1 |
| 2016/0036838 A1* | 2/2016 | Jain | H04L 67/10 | 726/23 |
| 2016/0070590 A1* | 3/2016 | Eicher | G06F 9/505 | 719/320 |
| 2016/0170894 A1* | 6/2016 | Sugisaki | G06F 3/0673 | 711/125 |
| 2016/0210166 A1* | 7/2016 | Cucinotta | H04L 67/1002 | |
| 2016/0217390 A1* | 7/2016 | Shoaib | G06N 20/00 | |
| 2016/0260023 A1* | 9/2016 | Miserendino, Jr. | G06N 20/00 | |
| 2016/0379686 A1 | 12/2016 | Burger et al. | | |
| 2017/0124487 A1* | 5/2017 | Szeto | G06N 20/00 | |
| 2017/0161117 A1* | 6/2017 | Fukuda | G06F 9/5083 | |
| 2017/0255248 A1* | 9/2017 | Crawford | G06F 1/3296 | |
| 2017/0295082 A1* | 10/2017 | Wu | H04L 67/10 | |
| 2017/0372268 A1* | 12/2017 | Ilan | G06Q 10/1095 | |
| 2018/0121298 A1* | 5/2018 | Johnson | G06F 11/1443 | |
| 2018/0181558 A1* | 6/2018 | Emery | H04M 3/4936 | |
| 2018/0262539 A1* | 9/2018 | Feast | H04L 67/24 | |
| 2018/0375998 A1* | 12/2018 | Beilis | H04L 51/02 | |
| 2019/0102700 A1* | 4/2019 | Babu | G06N 5/025 | |
| 2019/0130300 A1* | 5/2019 | Perone | G06F 13/16 | |
| 2019/0295158 A1* | 9/2019 | Wu | H04L 67/22 | |
| 2019/0325305 A1* | 10/2019 | Zhang | G06N 3/063 | |
| 2020/0151591 A1* | 5/2020 | Li | G06N 20/00 | |
| 2020/0311616 A1* | 10/2020 | Rajkumar | G06N 5/043 | |
| 2021/0256427 A1* | 8/2021 | Schott | G06F 9/44 | |

OTHER PUBLICATIONS

International Search Report and Written Opinion, PCT App. No. PCT/US2019/052951, dated Dec. 5, 2019, 10 pages.

Office Action, EP App. No. 19790344.6, dated Oct. 4, 2021, 6 pages.

* cited by examiner

HOSTING MACHINE LEARNING MODELS

BACKGROUND

Loading a machine learning model (e.g., retrieving the model from disk, storing it in memory, and instantiating it) on-the-fly in a hosted environment in response to a request from a user is typically not feasible because of the relatively high latency for the loading operations. Further, memory sizes for a single host typically do not allow for all models to be cached, or for all models to be cached economically.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for natural language understanding (NLU) are described. In particular, embodiments directed to auto-scaling, distributed, multi-tenant hosting of machine learning models for inference are detailed.

NLU models can be on the order of tens of megabytes (10-20 MB), hundreds of megabytes (such as 300-500 MB), etc. in size. In systems that have a large number of models or chat bots (also known as "bots") that may be used, hosting each model by loading into a computer system to be ready for use in inference is unlikely to be efficient. For example, in some systems out of a total of 120,000 bots, only 2,000 receive traffic on any given day. Hosting the remaining 118,000 bots simply is not likely to be an efficient use of resources that could be used by other tenants.

As noted above, the amount of storage and/or computing resources in does not lend to hosting all possible models is infeasible in many scenarios. Detailed herein are embodiments allowing for a proper subset of the possible models to be loaded on a set of hosts at any given point in time and a routing scheme which maps a model to hosts thus allowing, for example, a provider network to support models that are in-demand without inefficiently utilizing resources by either storing all models or incurring a delay to constantly load in and out models that as needed. In some embodiments, each host of the determined group of hosts caches a first plurality of machine learning models loaded in random access memory and caches a second, different plurality of machine learning models according to a least frequently used caching model in disk allowing for more frequently used models to be more readily available.

In some embodiments, one or more groups of autoscaling hosts provide dynamic compute instances that house models that are more likely to be used than those that are not (thus, reducing memory footprints, saving energy, etc.). Typically, each host maps to at least one virtual node and an identifier of the machine learning model is hashed to at least one of the virtual nodes such that models can be spread out across physical devices. In some instances, which host to route to is randomly determined and a location of the randomly determined host dictates the group of hosts to route the utterance to. This randomness helps ensure that any one host is not overly taxed.

As needed, the autoscaling groups may add hosts and/or additional autoscaling groups may be spun up (to account for an increase in traffic, etc.). In some embodiments, as hosts are added or additional groups spun up, they are warmed to include models that are more likely to be needed.

Figure 1:
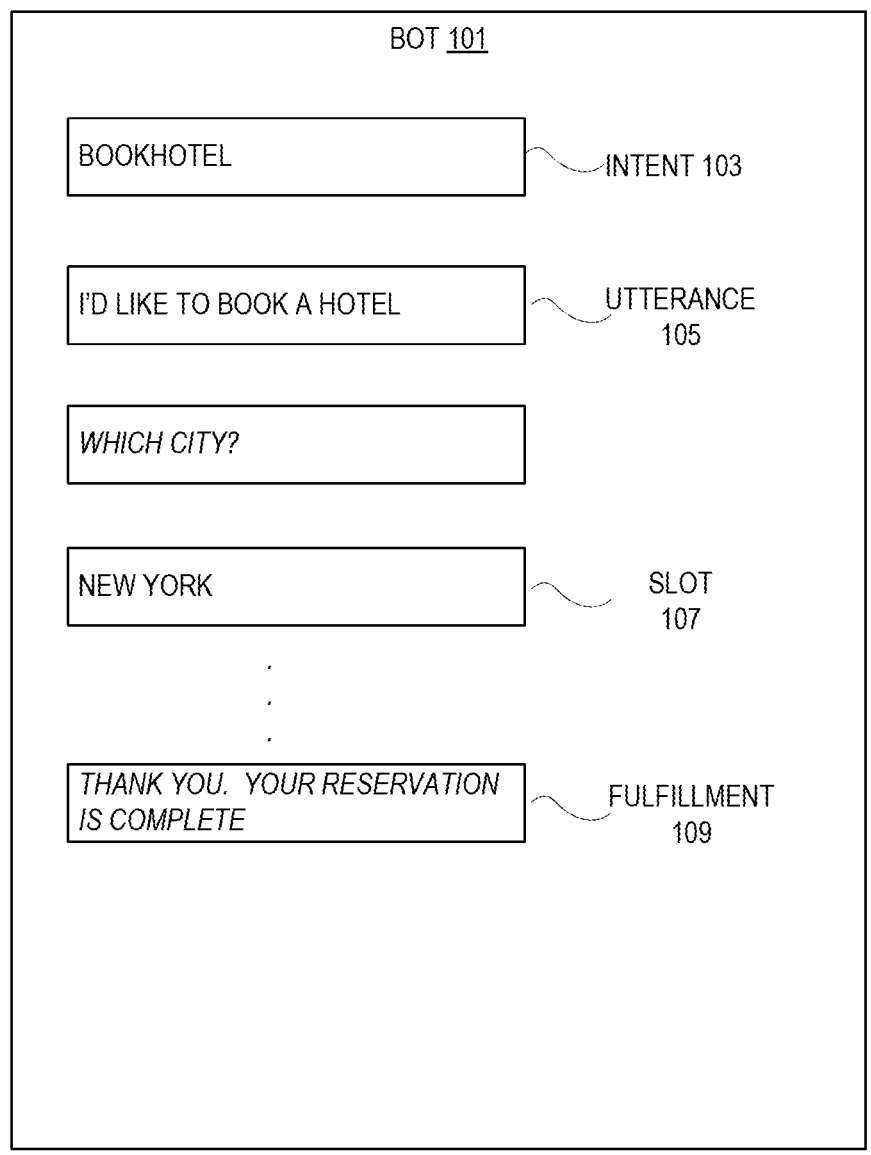
FIG. 1 illustrates an example embodiment of a bot usage.

FIG. 1 illustrates an embodiment of a bot usage involving a user conversing with the bot. In this example, the bot 101 is used to intake user input (such as utterances) and provide responses to the input (shown in italics). In this example, the intent 103 of the hot 101 is to book a hotel. An intent performs an action in response to natural language input.

A user provides an utterance 105 in the form of spoken or typed phrase that invokes the invent 103. Slots 107 are input data required to fulfill the intent. Finally, the bot 101 provides an indication of fulfillment. Detailed herein are embodiments directed to performing NLU of utterances as "I'd like to book a hotel" and "New York" in this example.

Figure 2:
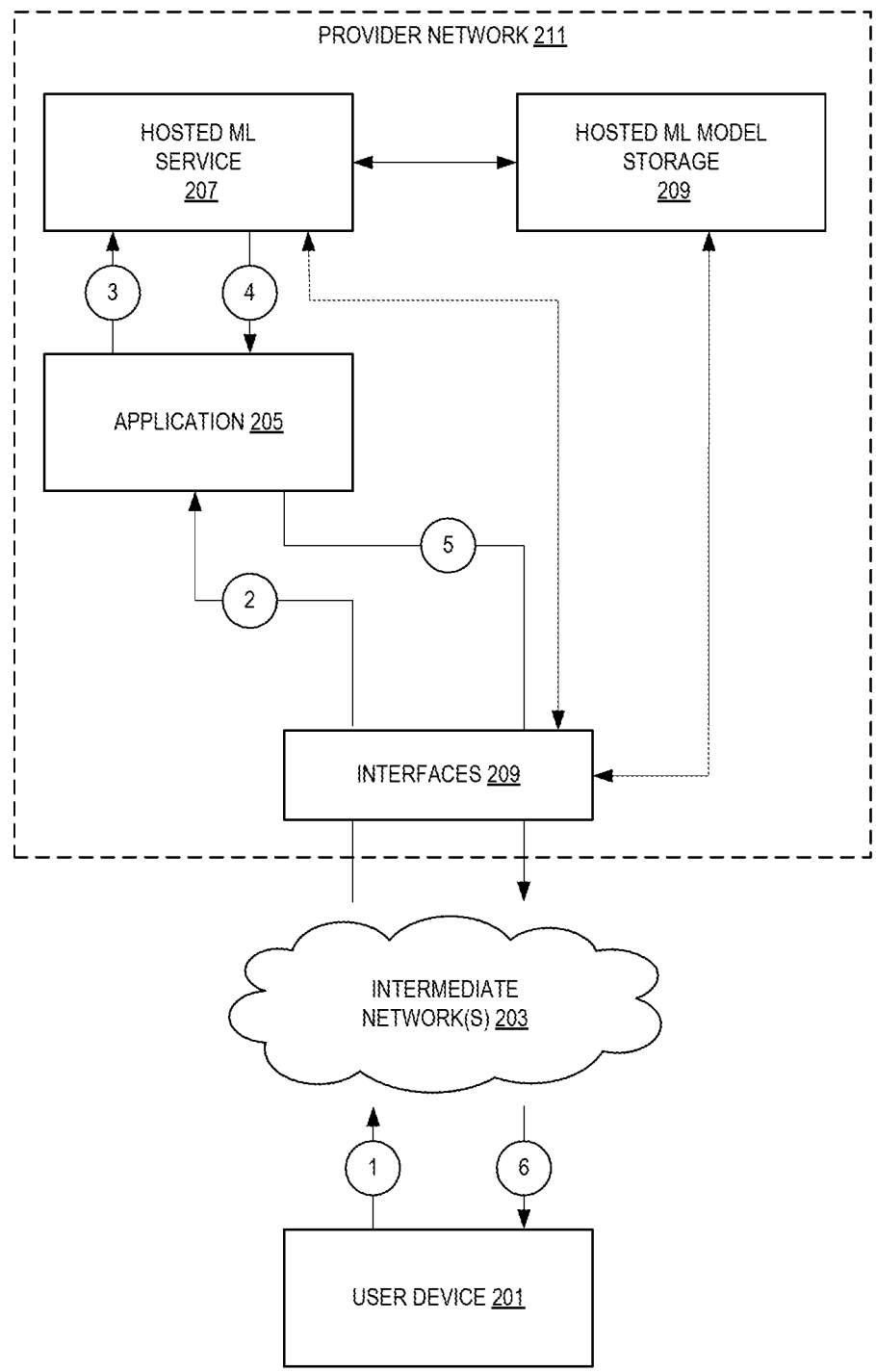
FIG. 2 illustrates example embodiments of a system for performing operations including inference.

FIG. 2 illustrates embodiments of a system for performing NLU operations including inference. As shown, in some embodiments, a provider network 211 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. for at least NLU. These and other computing resources may be provided as services, such as a hardware virtualization service that can execute compute instances, a storage service that can store data objects, etc. The users (which may or may not be customers who have a particular financial relationship with a service provider) of provider networks 211 may utilize one or more user accounts that are associated with a customer account, though these terms may be used somewhat interchangeably depending upon the context of use. User devices 201 may interact with a provider network 211 across one or more intermediate networks 203 (e.g., the internet) via one or more interface(s) 209, such as through use of application programming interface (API) calls, via a console implemented as a website or application, etc. The interface(s) 209 may be part of, or serve as a front-end to, a control plane of the provider network 211 that includes "backend" services supporting and enabling the services that may be more directly offered to customers. Note that in some embodiments a provider network 211 is not utilized for hosting the ML service 207; instead, another computer system is used for hosting the ML service 207.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In this illustration, the provider network 211 provides ML services including, but not limited to, NLU services such as inference for utterances in support of an application 205. As shown, at circles 1 and 2, a user device communicates with the provider network 211 via intermediate networks 203 and interfaces 209. In particular, the user device communicates with an application 205 (such as a bot) that is going to utilize the hosted ML service 207. Note that this is exemplary, and this application 205 is not utilized in all instances. An example of a communication is an "utterance" and this example will be used throughout the remainder of this description.

The application 205 takes the utterance and makes a request to the hosted ML service 207 at circle 3. The hosted ML service 207 hosts machine learning (ML) models for different entities on a shared fleet of physical and/or virtual hosts. The compute capacity used for the ML models may be scaled with the throughputs of bots and allows the fleet to scale with the total memory consumption of the ML models. The hosted ML models may be custom (customer provided) or provided by the service. The hosted ML service 207 may include, for example, an inference component which will perform an inference operation (such as on an utterance) using a ML model it acquired from hosted ML model storage 209.

The results of the operation are returned to the application 205 at circle 4 and then forward back to the user device as needed in circles 5 and 6.

Figure 3:
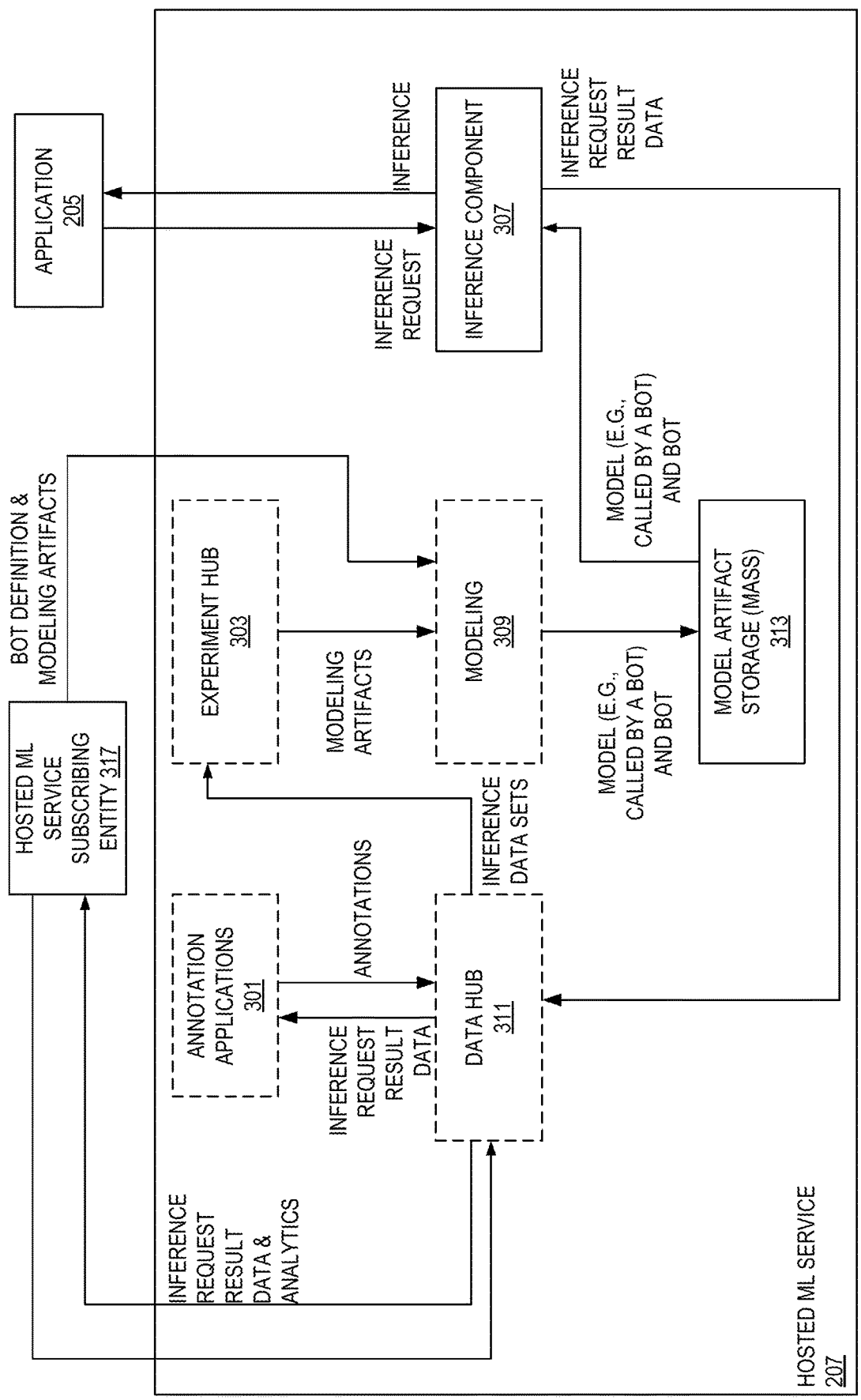
FIG. 3 illustrates example embodiments of a system for handling inferences in a provider network along with an application and a service subscribing entity.

FIG. 3 illustrates embodiments of a system for handling ML inferences in a provider network along with an application and a ML service subscribing entity. In particular, embodiments of an ML service 207 are shown.

A ML service subscribing entity 317 provides bot definitions and/or modeling artifacts (ML models) to the ML service 207. An application 205 interfaces with the provided bot(s) and/or modeling artifacts (model, training data, etc.).

An inference component 307 serves requests to perform inferences (such as extract information (such as domain, intent, and/or slot labels) from utterances) provided by the application 205 (such as via a bot) and structure the extracted information in a developer-consumable way (such as slot resolution). The inference component 307 performs one or more of preprocessing text, load necessary artifacts, invoking algorithms for machine learning tasks such as intent classification and slot labeling, postprocessing the output, and/or dialog frame merging in some embodiments.

In some embodiments, the inference component 307 uses consistent hashing routing to route inference requests to a particular inference service group (ISG) which is an auto-scaling group of hosts. Inference service groups are discussed in more detail later. Further, in some embodiments, a load balancer of the inference component 307 uses target groups and listener rules with path-based routing to route the requests to the inference service group. Each ISG hosts a set of models and scales up based on the throughput of the models hosted in the ISG. Details of some embodiments of the inference component 307 are detailed in subsequent figures and corresponding discussion.

A model artifact storage (MASS) 313 is an available and scalable data store that persists model artifacts to be used by the inference component 307. In some embodiments, the MASS 313 is optimized for read access (serves most of the read traffic from cache). In some embodiments, ML model storage 209 at least includes the MASS 313.

In some embodiments, the ML service 207 includes a modeling component 309 which produces items to be used for inference. As such, the modeling component 309 serves requests to create and manage all modeling artifacts. Examples of items that are produced for NLU inference include, but are not limited to: a word embeddings model, built-in artifacts such as catalogs and grammars, and bots.

In some embodiments, a data hub 311 stores and serves data pertaining to inference results and/or requests to one or more entities such as a ML service subscribing entity 317, annotation applications 301, and an experiment hub 303. Inference results may include includes debugging information provided by the inference component 307. The data hub 311 allows for querying of inference results and annotation. The data hub 311 exports inference result data and or analytics.

In some embodiments, the experiment hub 303 provides a secure environment with the tools to access utterance data (from the data hub 311) and perform experiments with them. Artifacts produced using the experiment hub 303 are published to the MASS 313 via the modeling component 309. There will be severe restrictions on what data can come in or go out of this system.

In some embodiments, the annotation applications 301 are a collection of tools to annotate data provided by the data hub 311.

Figure 4:
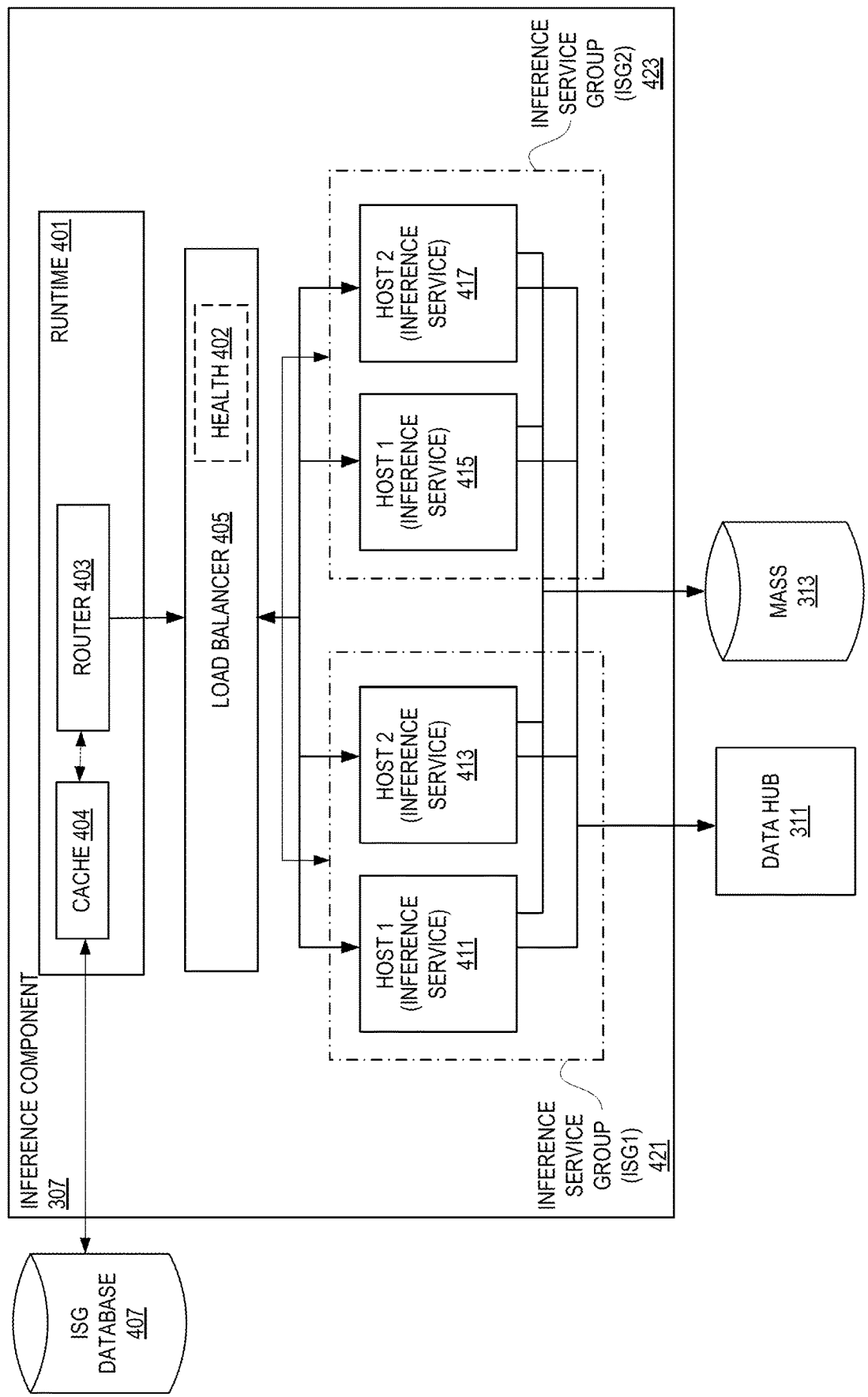
FIG. 4 illustrates example embodiments of an inference component.

FIG. 4 illustrates embodiments of an inference component such as inference component 307. An inference component comprises one or more inference service hosts 411-417 that are a part of one or more ISGs 421 and 423. As shown, each ISG 421 and 423 is a collection of inference service hosts that serve the same set of models. An ISG 421 or 423 is implemented using scaling groups that can scale up or down based on the throughput of the models that are hosted in the ISG 421 or 423.

The inference service hosts 411-417 of the ISGs 421 or 423 host interference services that perform inference operations on received utterances and make the results of such inferences available. In some embodiments, an inference service is a collection of containerized micro-services that are hosted on the same host and work together to generate NLU interpretations with tasks like intent classification, slot labeling, multi-turn dialog support, context awareness, etc.

A ISG database 407 includes a list of model to ISG mappings. In some embodiments, the ISG database 407 includes a list of inference worker hosts and their health status. In some embodiments, the worker host database 407 also stores an indication of what models are loaded or in the overflow model cache. At service startup time, the ISG database 407 is are polled to retrieve the list and used to update the cache 404 with the appropriate models, etc. During execution, in some embodiments, this ISG database 407 is polled at some interval for the list to help determine how to load additional hosts, add new ISGs, etc.

The router 403 of the inference component runtime 401 receives inference request data (such as utterances) from a client to be processed and uses a consistent hashing scheme to route utterances to an ISG 421 or 423 via a load balancer 405. In some embodiments, the router 403 is a virtual router responsible for determining which ISG is to receive an inference request. In some embodiments, the load balancer 405 includes a health checking mechanism that is detailed with respect to FIG. 12.

Figure 5:
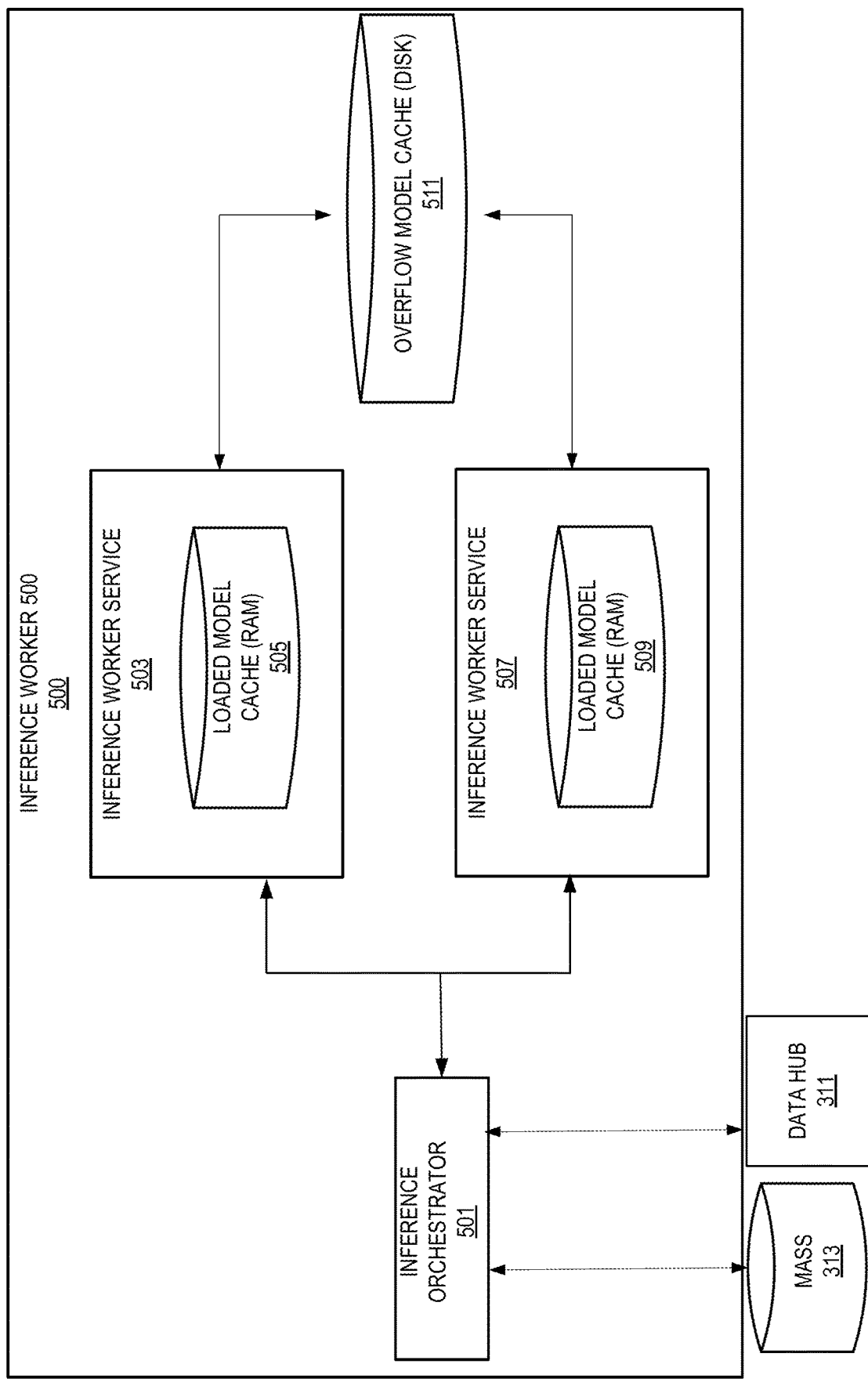
FIG. 5 illustrates example embodiments of an inference service on a single host.

FIG. 5 illustrates embodiments of an inference service on a single host. The entry point of the inference service 500 is the inference orchestration service 501. The inference orchestrator service 501 generates interpretations from text. In some embodiments, the inference orchestrator service 501 comprises a plurality of software modules to perform artifact/bundle management, pre-processing, recognizing, resolving (slot resolution), context managing (e.g., dialog act support, context carryover), connecting with the data hub 311 to provide results of an inference, and connecting with the MASS 313 to bring in a ML model to disk 511 or cache 505/509 or evict a model to the MASS 313.

The inference orchestrator service 501 couples to one or more inference worker services 503 and 507. Each inference worker service 503 or 507 performs actual inference job using model-based inference. Examples of such models include, but are not limited to: DiSAN (DNN), CRF (statistical), and/or FST (deterministic). Note that the inference orchestrator service 501 and one or more inference worker services 503 and 507 are software components executing on hardware.

As noted above, it is usually not practical to have all known models loaded by any given inference worker service 503 or 507. Rather, a proper subset of models are loaded in a "model cache" 505 or 509 such as random access memory (RAM) on a physical host. A list of models that are present in memory is maintained in some embodiments.

Another "cache" is external to RAM such as a on disk in a physical host. This is an "overflow" model cache 511. This overflow cache 511 offers another means to potentially save a loading from the MASS of a model. Further, models are written to the overflow model cache 511 upon server shutdown and read from disk and loaded in the loaded model caches 505 and 509 upon service startup.

When a model inference request comes in that there is not a corresponding model in either the loaded model caches 505 or 509, or the overflow model cache 511, a call is made to the MASS to fetch the model, the least frequently used model is evicted from the caches, and the fetched model is loaded for execution and used to generate an inference.

Figure 6:
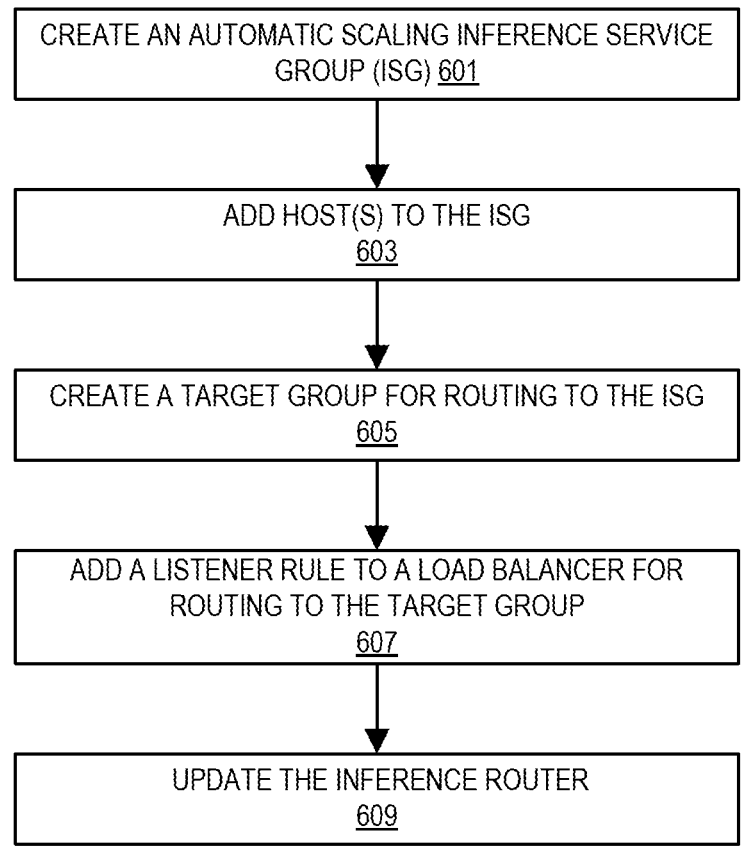
FIG. 6 illustrates example embodiments of a method for configuring an ISG.

FIG. 6 illustrates example embodiments of a method for configuring an ISG. In some embodiments, aspects of the method are performed by the inference component 307. In some embodiments, aspects of the method are performed by a front end (such as interfaces 209).

At 601, an ISG is created as an auto scaling group (ASG) in response to a user request. An AST contains a collection of compute instances that share similar characteristics and are treated as a logical grouping for the purposes of instance scaling and management. User requests for creating an ASG may come in the form of using a launch template, a launch configuration, a wizard, using an instance, etc. For example, a user provides configuration information (such as a group name, group size (a number of initial instances for the group), etc.) for an ASG for the ISG through a web interface of the provider network, and the front end of the provider network then configures the ISG using the configuration information.

Hosts are added to the created ISG at 603. For example, a user provides information as to which hosts are to be added (such as an identifier of a host) to the ISG through a web interface of the provider network and the front end of the provider network then configures the ISG to include one or more hosts.

A target group is created for routing to the created ISG at 605. A target group is used to route requests to one or more registered targets based on listener rules. Listener rules define how the load balancer 405 is to route requests to the targets in one or more target groups. In some embodiments, each listener rule consists of one or more of a priority (order to evaluate the rule within a set), an action (a type (such as authenticate, respond, forward, redirect, etc.), order, and information required to perform the action), a host condition (rule for forwarding requests to different target groups based on the host name), and a path condition (rule for forwarding requests to different target groups based on the path of the request). When a rule condition is met, traffic is forwarded to a corresponding target group.

One or more listener rules are placed into load balancer 405 for routing requests to the above target group with path-based routing at 607. For example, a listener rule like "/ISG1/*'->target-group1" will make requests like "inference-worker.awsamazon.com/ISG1/infer" route to ISG1.

Finally, the router 403 is updated to start routing to the newly created inference service group at 609. In some implementations this updating is called discovery. In essence, the router 403 needs to know about the list of inference service groups that it supports both to use consistent hash-based routing and to construct a URL for routing. In some embodiments, to update the list, an entry is manually entered into a whitelist configuration, however, it will not require a deployment to propagate the change.

Figure 7:
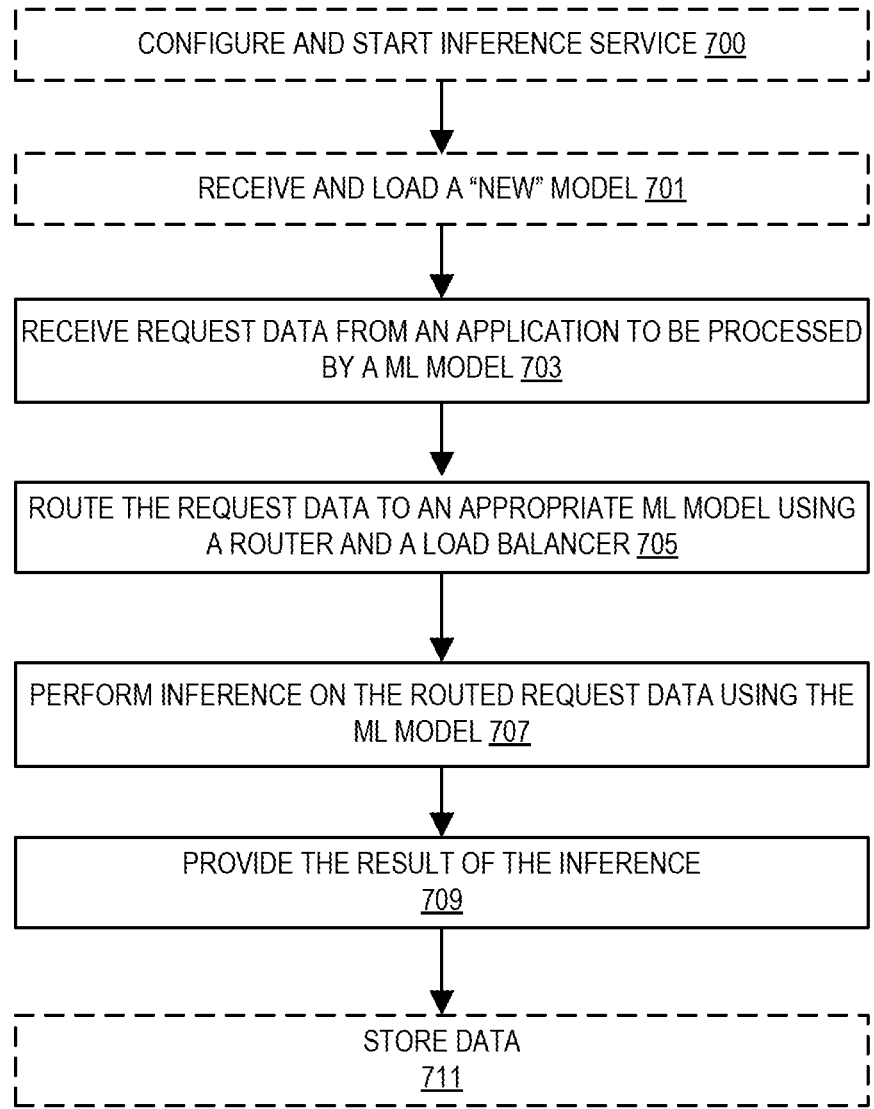
FIG. 7 illustrates example embodiments of a method of utilizing a service for inferencing.

FIG. 7 illustrates example embodiments of a method of utilizing a ML service for inferencing. At 700, a ML inference component 307 is configured and started in some embodiments. For example, one or more ISGs are configured, models are loaded into hosts, the etc. Examples of configuring ISGs as ASGs are described with respect to FIG. 6. In some embodiments, models are loaded based on a least frequently used (LFU) caching strategy from either MASS 313 or disk 511. Models are loaded from disk 511 if available.

With an up and running inference component 307, in some embodiments, a "new" model is received and loaded at 701. In some embodiments, new models are loaded by submitting a "dummy" request to a host that does not include an data to use in an inference (such as an utterance). The lack of anything to operate on causes the host to load the new model into its cache from the MASS 313. As such, when a "real" request comes in with data to use in an inference (such as an utterance), the new model will be loaded and ready to use. Note, that depending upon utilization, a new model may force a lesser used model to be flushed to disk or removed all together from the host.

At some point in time, a request to perform an inference for data to use in an inference (such as an utterance) using a particular hosted ML model is received at 703. For example, an utterance provided by a user to a bot is received at the inference component 307 at the router 403.

The request data (such as an utterance) is routed to the appropriate ML model at 705. Embodiments of an exemplary method of routing are detailed with respect to FIG. 8.

The appropriate ML model performs the inference on the routed data (such as an utterance) at 707 and provides a result of the inference at 709. For example, a FST is performed and the result provided back to a requesting bot.

In some embodiments, a result of the inference and/or the data to use in an inference (such as an utterance) is stored at 711 such as detailed earlier.

Figure 8:
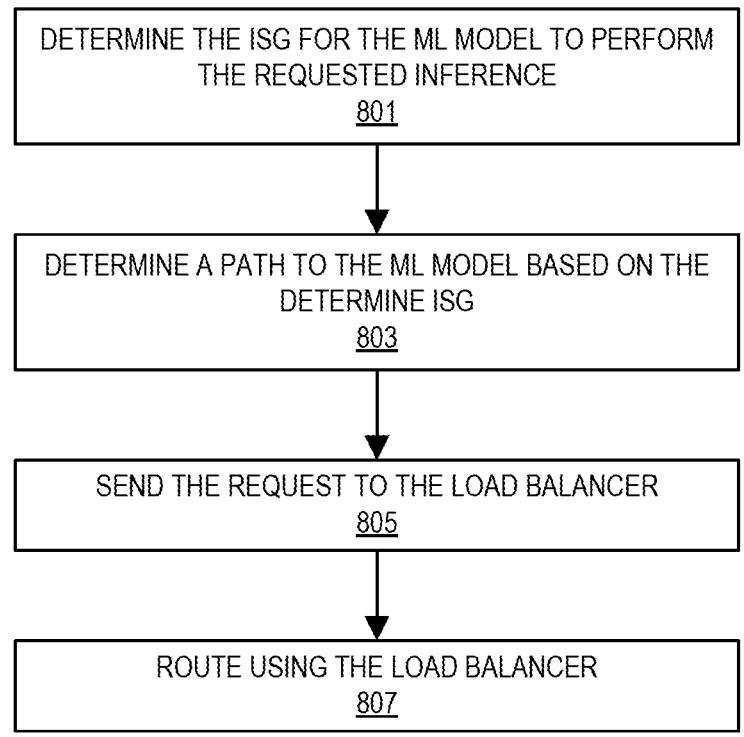
FIG. 8 illustrates example embodiments of methods for routing an inference request.

FIG. 8 illustrates example embodiments of methods for routing an utterance inference request. At 801, the router 403 uses a consistent hash to determine the ISG (a particular set of hosts) for the model to service the inference request. For consistent hashing, each host (such as hosts 411-417) maps to "A" virtual nodes, and given a total of "N" hosts there would be A×N number of virtual nodes. These virtual nodes are hashed. As inference requests for a model are received, the model identifier is hashed to the same sub-space and virtual nodes which belong to different compute regions. Each compute region is typically in a different physical location, however, that is not true in all implementations. The inference request is routed to one of these hosts randomly, and the location of that random host determines the ISG. What hosts have what models may be found by querying the cache 404 and/or the ISG database 407.

A URL (path) based on the determined ISG is generated at 803. For example, the URL "inference-worker.aws.amazon.com/ISG1/infer" is generated to use ISG1.

The request and URL are then sent to the load balancer 405 at 805 for routing to the appropriate ISG. The load balancer 405 uses listener rules to map to the ISG of a target group. For example, the load balancer 405 maps the path '/ISG1/*' to a target group.

The load balancer 405 routes requests according to the mapping at 807.

Figure 9:
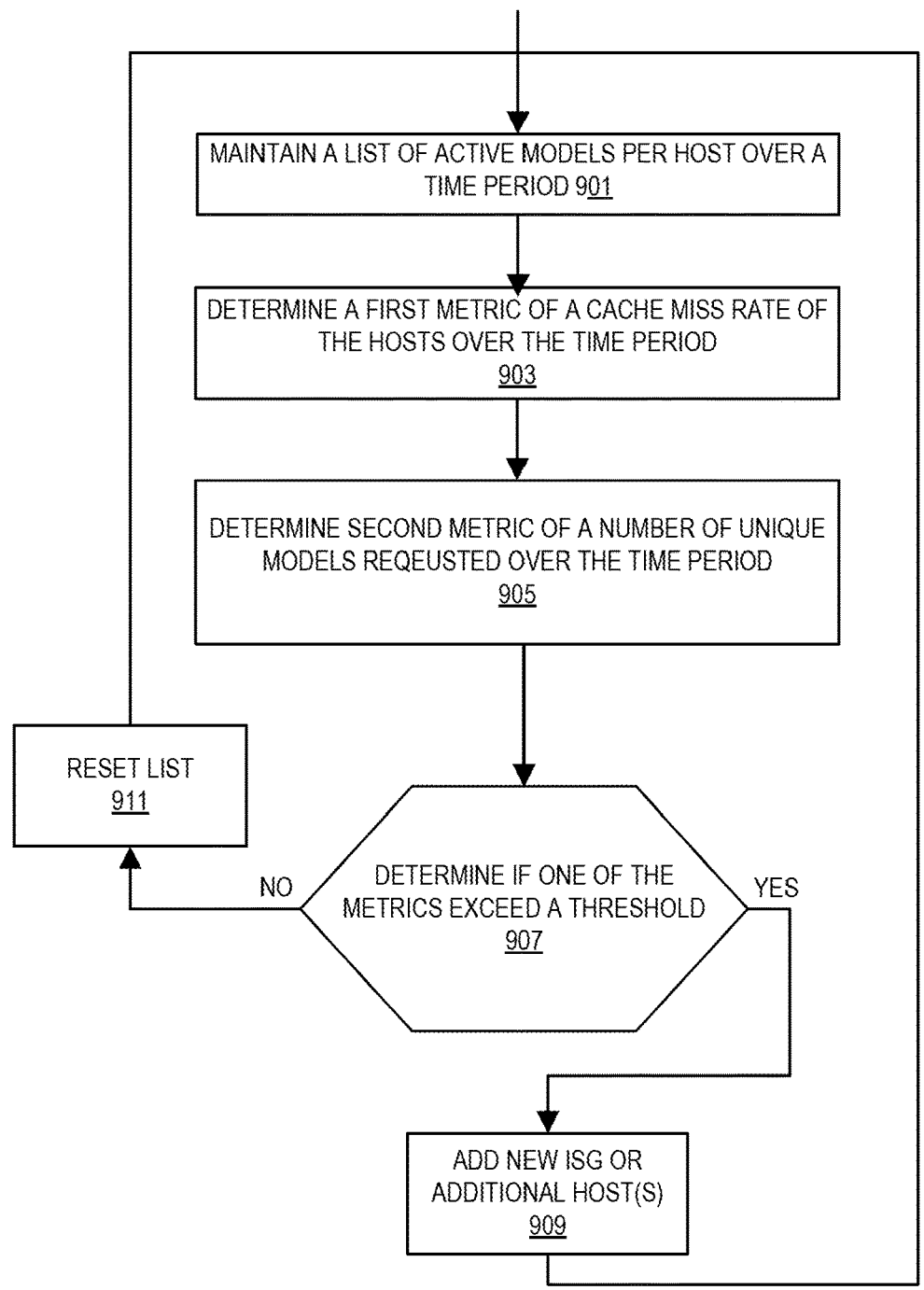
FIG. 9 illustrates example embodiments of a method for ISG management.

FIG. 9 illustrates example embodiments of a method for ISG management. This is performed in parallel to routing requests, performing inferences, etc. In some embodiments, this is performed by the router 403. The router 403 maintains a list of active models per host over a given time period at 901. For example, the router 403 updates the ISG database 407 with what models are loaded or in the overflow model cache.

The router 403 determines a first metric with respect to the hosts of a cache miss rate of the hosts over the time period at 903. This miss rate is determined from the number of requests that cannot be served by a host as the requested model is not loaded over the time period that the list of active models is maintained. In some embodiments, this is a thrashing metric.

The router 403 determines a second metric with respect to the hosts of a number of unique models requested over the time period at 905. This metric is determined by counting the number of unique model requests.

A determination is made if either of the metrics is over a threshold at 907. Exemplary thresholds may include but are not limited to: a cache miss rate over 10% or a number of unique models requested being more than 5. When both metrics are compliant (e.g., not exceeded), the list of models to track is reset to be consistent with the subsequent time period (note that new models may have been loaded, models sent to disk, etc. turning the first time period) at 911 and a new list is maintained at 901. When either or both metrics are not compliant, new ISG host(s) are added and/or an indication to add a new ISG is generated at 909. In some embodiments, the indication is sent to a management and monitor service to forward to an admin or other user and/or start a process of automatically adding a new ISG. A new host is added as detailed with respect to FIG. 11. Adding an ISG is detailed in FIG. 6.

Figure 10:
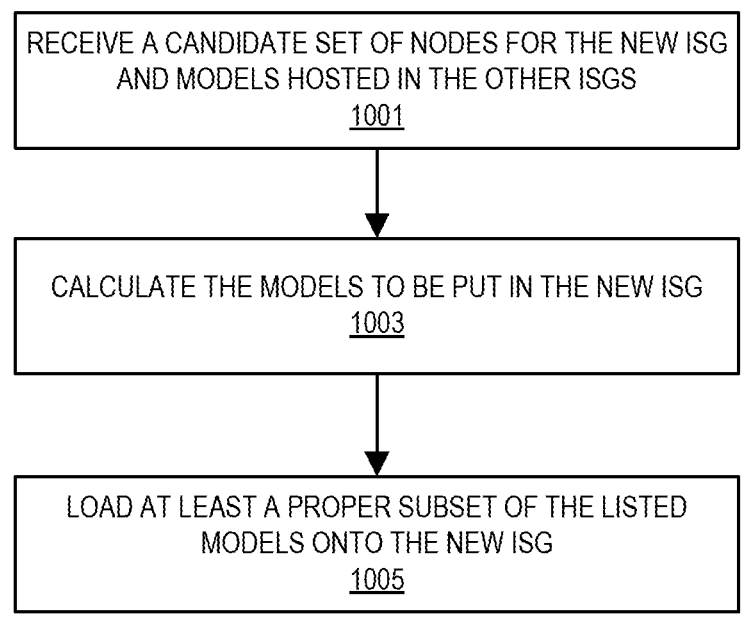
FIG. 10 illustrates example embodiments of a method for warming a new ISG.

FIG. 10 illustrates example embodiments of a method for warming a new ISG. An ISG being added to the consistent hashing scheme should be "warmed" prior to use. This warming includes loading of artifacts (models, training data, etc.). In some embodiments, embodiments of the method are performed by the router 403 upon a determination that a new ISG should be added.

At 1001, the router 403 receives a candidate set of nodes to use for the new group along with the set of all the models hosted in all of the ISGs. The set of models may be found in the ISG database 407. In some embodiments, the set of candidate nodes are provided as a part of the ISG generation.

The router 403 determines the models to be put in the new ISG at 1003. The router 403 may make this determination based on one or more factors. For example, the router 403 may consider the amount of traffic directed to a particular host (and therefore which models are most impactful from a traffic standpoint and may be best to have on several hosts), the amount of memory available in a particular host to store models (as some models are larger than others each host is memory bound as to what models it can load), thrashing of models from cache to disk, etc. In that in some embodiments, the router 403 will also move models to "re-balance" ISGs. For example, moving a large model from a first ISG to a second ISG will remove traffic directed to the first ISG.

The models to be loaded are loaded into the new ISG at 1005.

Figure 11:
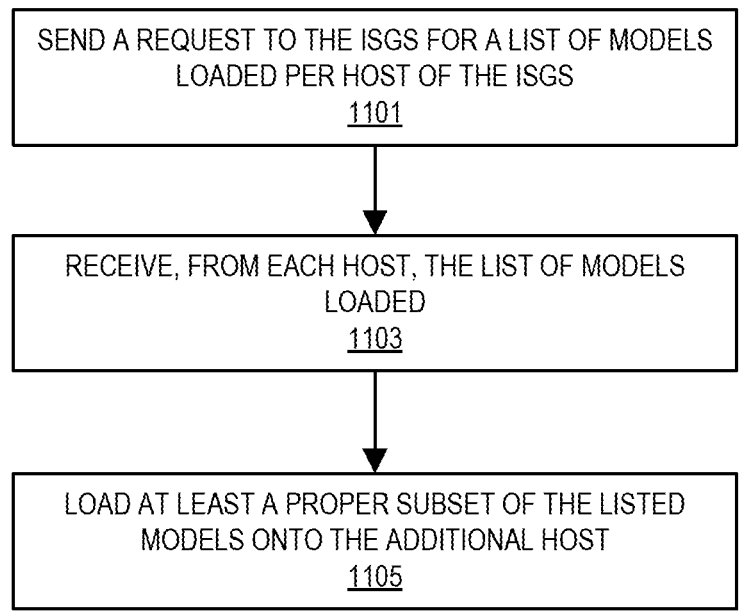
FIG. 11 illustrates example embodiments of a method for scaling the number of hosts and loading any new hosts.

FIG. 11 illustrates example embodiments of a method for increasing the number of hosts and loading models into new hosts. In some embodiments, embodiments of the method are performed by the load balancer 405 upon a determination that another node or nodes should be added to a ISG.

A request is sent to the ISGs that service requests processed by the router 403 for a list of models that each host has cached (loaded either locally or on disk) and utilization statistics of these models at 1101.

The list of the loaded models and the utilization statistics are received by the load balancer 405 at 1103.

The load balancer 405 then uses the list and statistics to determine which of the models to load and fetches those models from the MASS 313 at 1105. In some embodiments, models with low usage are not fetched. In other embodiments, models are fetched according to usage levels with the more frequently used models loaded first.

Figure 12:
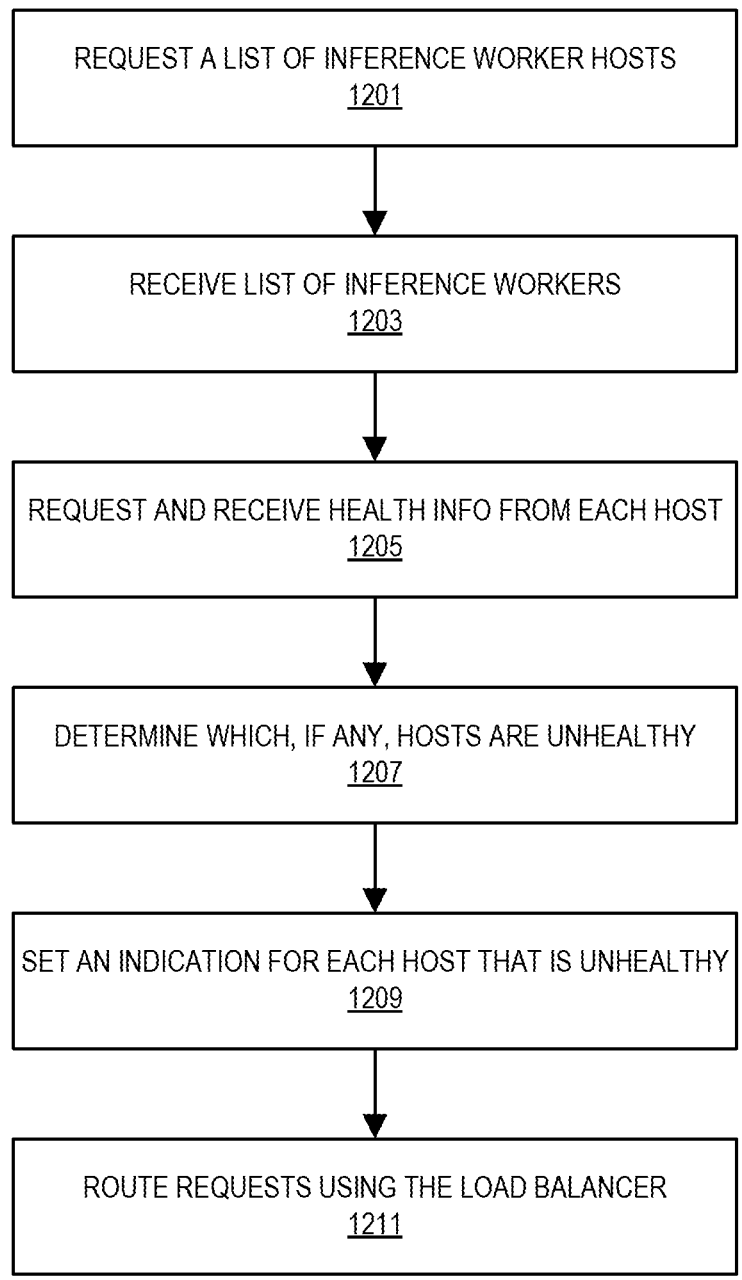
FIG. 12 illustrates example embodiments of a method for using health information of hosts.

FIG. 12 illustrates example embodiments of a method for using health information of hosts. This is performed in parallel to routing requests, performing inferences, etc. In some embodiments, a health checker 402 runs in the load balancer 405 instance which works in conjunction with the load balancer 405 to rebalance hosts.

At 1201, the health checker 402 requests a list of inference worker hosts. This list may come from the worker host database 407 or be gathered from individual ISGs 421 and 423 depending upon the implementation.

The health checker 402 receives this list at 1203 and then queries each inference worker host for its health information with respect to the load balancer 405 and receives a response at 1205. Health information may include L7 information such as a ping protocol used to connect with the host, a port used to connect to the port (such as is there a timeout on that port?), a ping path (is there response within a set timeout period), etc.

At 1207, a determination of which, if any, hosts are unhealthy is made using the received health information. Unhealthy hosts are those which meet a defined policy such as timing out or taking too long to respond.

Updated health status information is stored in the worker host database 407 at 1209.

In some embodiments, health check settings for the load balancer 405 are on a per target group basis. Each target group uses the default health check settings, unless they are overridden when the target group was created or modified. The load balancer 405 monitors the health status information of all targets registered with the target group and routes requests to the registered targets that are healthy at 1211.

Figure 13:
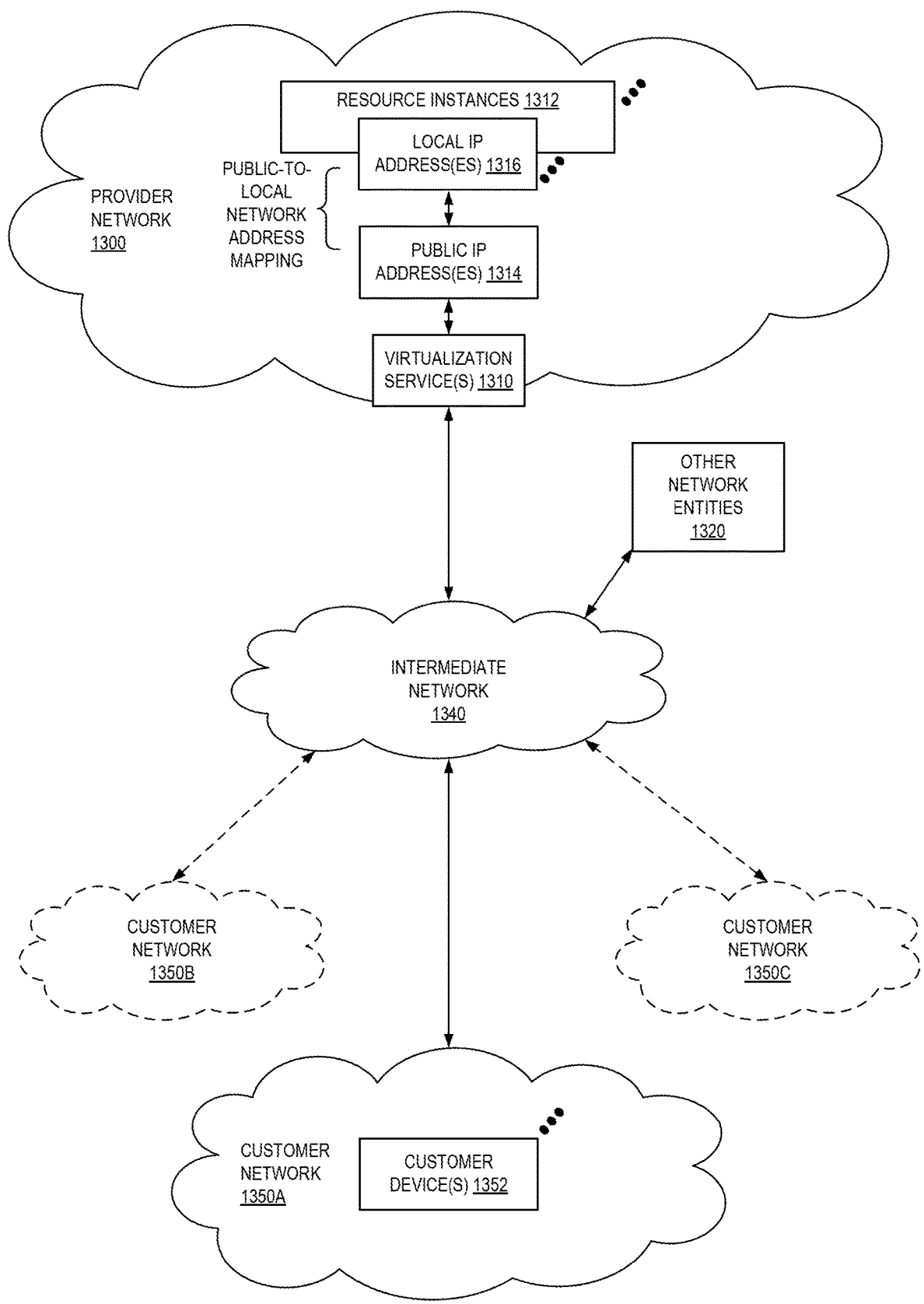
FIG. 13 illustrates an example provider network environment according to some embodiments.

FIG. 13 illustrates an example provider network (or "service provider system") environment according to some embodiments. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some embodiments, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
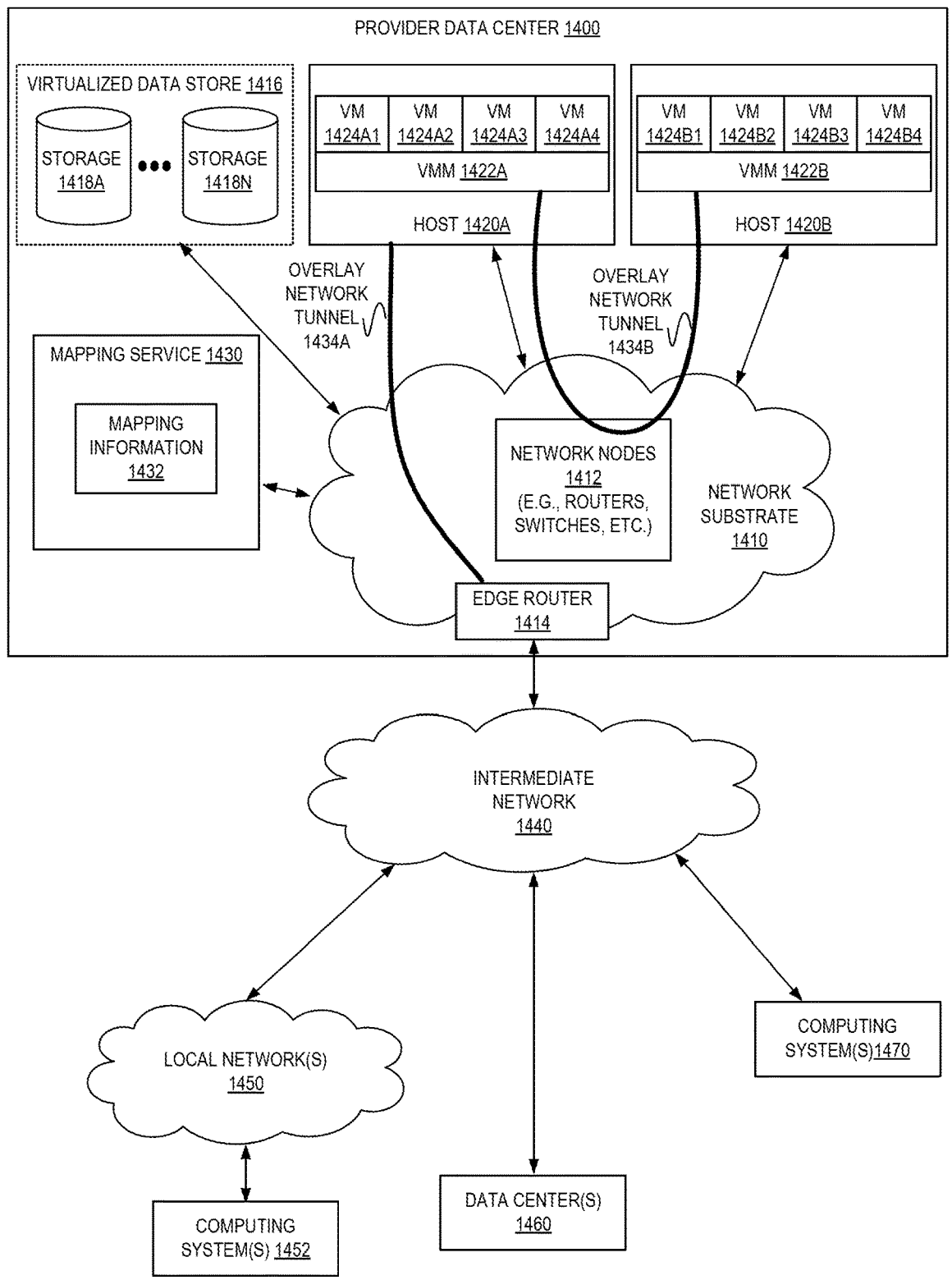
FIG. 14 illustrates an example data center that implements an overlay network on a network substrate using IP tunneling technology according to some embodiments.

FIG. 14 illustrates an example data center that implements an overlay network on a network substrate using IP tunneling technology, according to some embodiments. A provider data center 1400 may include a network substrate that includes networking nodes 1412 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1410 using tunnels. The IP tunneling technology may provide a mapping and encapsulating system for creating an overlay network on a network (e.g., a local network in data center 1400 of FIG. 14) and may provide a separate namespace for the overlay layer (the public IP addresses) and the network substrate 1410 layer (the local IP addresses). Packets in the overlay layer may be checked against a mapping directory (e.g., provided by mapping service 1430) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1430) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 14, an example overlay network tunnel 1434A from a virtual machine (VM) 1424A (of VMs 1424A1-1424A4, via VMM 1422A) on host 1420A to a device on the intermediate network 1450 and an example overlay network tunnel 1434B between a VM 1424A (of VMs 1424A1-1424A4, via VMM 1422A) on host 1420A and a VM 1424B (of VMs 1424B1-1424B4, via VMM 1422B) on host 1420B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 14, at least some networks in which embodiments may be implemented may include hardware virtualization technology that enables multiple operating systems to run concurrently on a host computer (e.g., hosts 1420A and 1420B of FIG. 14), i.e. as virtual machines (VMs) 1424 on the hosts 1420. The VMs 1424 may, for example, be executed in slots on the hosts 1420 that are rented or leased to customers of a network provider. A hypervisor, or virtual machine monitor (VMM) 1422, on a host 1420 presents the VMs 1424 on the host with a virtual platform and monitors the execution of the VMs 1424. Each VM 1424 may be provided with one or more local IP addresses; the VMM 1422 on a host 1420 may be aware of the local IP addresses of the VMs 1424 on the host. A mapping service 1430 may be aware of (e.g., via stored mapping information 1432) network IP prefixes and IP addresses of routers or other devices serving IP addresses on the local network. This includes the IP addresses of the VMMs 1422 serving multiple VMs 1424. The mapping service 1430 may be centralized, for example on a server system, or alternatively may be distributed among two or more server systems or other devices on the network. A network may, for example, use the mapping service technology and IP tunneling technology to, for example, route data packets between VMs 1424 on different hosts 1420 within the data center 1400 network; note that an interior gateway protocol (IGP) may be used to exchange routing information within such a local network.

In addition, a network such as the provider data center 1400 network (which is sometimes referred to as an autonomous system (AS)) may use the mapping service technology, IP tunneling technology, and routing service technology to route packets from the VMs 1424 to Internet destinations, and from Internet sources to the VMs 1424. Note that an external gateway protocol (EGP) or border gateway protocol (BGP) is typically used for Internet routing between sources and destinations on the Internet. FIG. 14 shows an example provider data center 1400 implementing a network that provides resource virtualization technology and that provides full Internet access via edge router(s) 1414 that connect to Internet transit providers, according to some embodiments. The provider data center 1400 may, for example, provide customers the ability to implement virtual computing systems (VMs 1424) via a hardware virtualization service and the ability to implement virtualized data stores 1416 on storage resources 1418A-1418N via a storage service.

The data center 1400 network may implement IP tunneling technology, mapping service technology, and a routing service technology to route traffic to and from virtualized resources, for example to route packets from the VMs 1424 on hosts 1420 in data center 1400 to Internet destinations, and from Internet sources to the VMs 1424. Internet sources and destinations may, for example, include computing systems 1470 connected to the intermediate network 1440 and computing systems 1452 connected to local networks 1450 that connect to the intermediate network 1440 (e.g., via edge router(s) 1414 that connect the network 1450 to Internet transit providers). The provider data center 1400 network may also route packets between resources in data center 1400, for example from a VM 1424 on a host 1420 in data center 1400 to other VMs 1424 on the same host or on other hosts 1420 in data center 1400.

A service provider that provides data center 1400 may also provide additional data center(s) 1460 that include hardware virtualization technology similar to data center 1400 and that may also be connected to intermediate network 1440. Packets may be forwarded from data center 1400 to other data centers 1460, for example from a VM 1424 on a host 1420 in data center 1400 to another VM on another host in another, similar data center 1460, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1418A-1418N, as virtualized resources to customers of a network provider in a similar manner.

Figure 15:
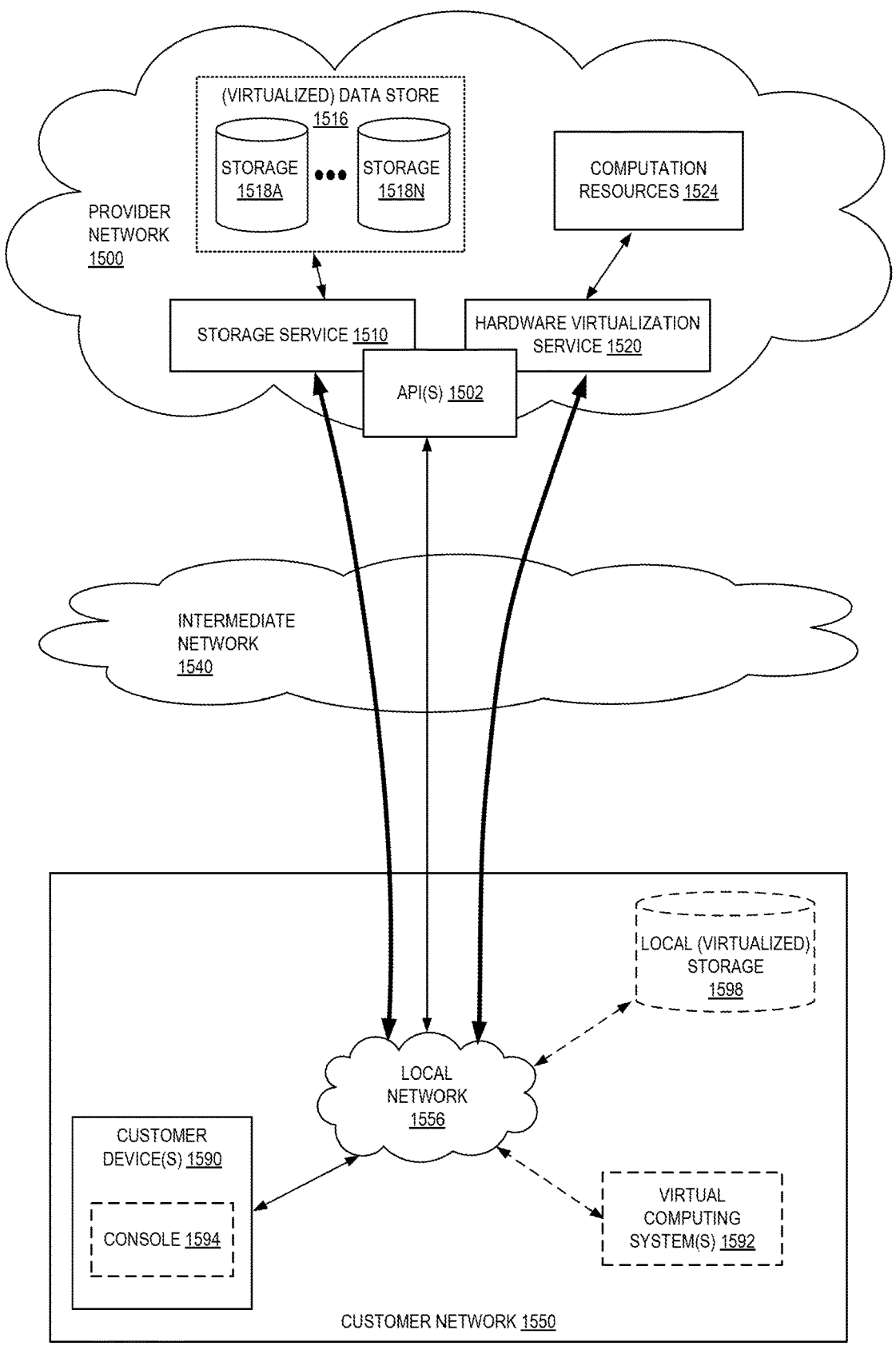
FIG. 15 is a block diagram of an example provider network that provides a storage service and a hardware virtualization service to customers according to some embodiments.

FIG. 15 is a block diagram of an example provider network that provides a storage service and a hardware virtualization service to customers, according to some embodiments. Hardware virtualization service 1520 provides multiple computation resources 1524 (e.g., VMs) to customers. The computation resources 1524 may, for example, be rented or leased to customers of the provider network 1500 (e.g., to a customer that implements customer network 1550). Each computation resource 1524 may be provided with one or more local IP addresses. Provider network 1500 may be configured to route packets from the local IP addresses of the computation resources 1524 to public Internet destinations, and from public Internet sources to the local IP addresses of computation resources 1524.

Provider network 1500 may provide a customer network 1550, for example coupled to intermediate network 1540 via local network 1556, the ability to implement virtual computing systems 1592 via hardware virtualization service 1520 coupled to intermediate network 1540 and to provider network 1500. In some embodiments, hardware virtualization service 1520 may provide one or more APIs 1502, for example a web services interface, via which a customer network 1550 may access functionality provided by the hardware virtualization service 1520, for example via a console 1594 (e.g., a web-based application, standalone application, mobile application, etc.). In some embodiments, at the provider network 1500, each virtual computing system 1592 at customer network 1550 may correspond to a computation resource 1524 that is leased, rented, or otherwise provided to customer network 1550.

From an instance of a virtual computing system 1592 and/or another customer device 1590 (e.g., via console 1594), the customer may access the functionality of storage service 1510, for example via one or more APIs 1502, to access data from and store data to storage resources 1518A-1518N of a virtual data store 1516 (e.g., a folder or "bucket", a virtualized volume, a database, etc.) provided by the provider network 1500. In some embodiments, a virtualized data store gateway (not shown) may be provided at the customer network 1550 that may locally cache at least some data, for example frequently-accessed or critical data, and that may communicate with storage service 1510 via one or more communications channels to upload new or modified data from a local cache so that the primary store of data (virtualized data store 1516) is maintained. In some embodiments, a user, via a virtual computing system 1592 and/or on another customer device 1590, may mount and access virtual data store 1516 volumes via storage service 1510 acting as a storage virtualization service, and these volumes may appear to the user as local (virtualized) storage 1598.

While not shown in FIG. 15, the virtualization service(s) may also be accessed from resource instances within the provider network 1500 via API(s) 1502. For example, a customer, appliance service provider, or other entity may access a virtualization service from within a respective virtual network on the provider network 1500 via an API 1502 to request allocation of one or more resource instances within the virtual network or within another virtual network.

Figure 16:
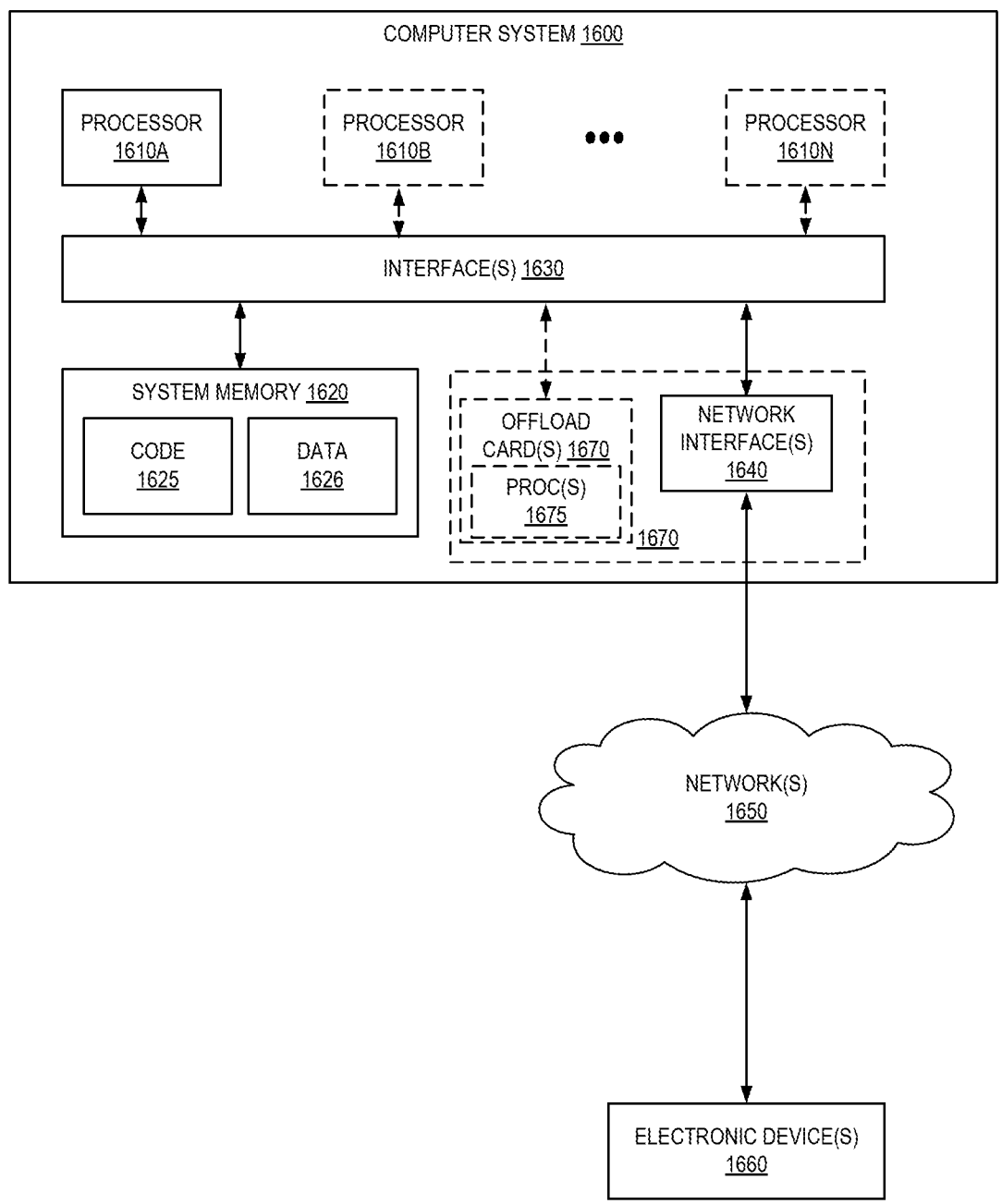
FIG. 16 is a block diagram illustrating an example computer system that may be used in some embodiments.

In some embodiments, a system that implements a portion or all of the techniques detailed above as described herein may include a general-purpose computer system that includes or is configured to access one or more computer-accessible media, such as computer system 1600 illustrated in FIG. 16. In the illustrated embodiment, computer system 1600 includes one or more processors 1610 coupled to a system memory 1620 via an input/output (I/O) interface 1630. Computer system 1600 further includes a network interface 1640 coupled to I/O interface 1630. While FIG. 16 shows computer system 1600 as a single computing device, in various embodiments a computer system 1600 may include one computing device or any number of computing devices configured to work together as a single computer system 1600.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1610 may commonly, but not necessarily, implement the same ISA.

System memory 1620 may store instructions and data accessible by processor(s) 1610. In various embodiments, system memory 1620 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1620 as code 1625 and data 1626.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems or devices as illustrated in FIG. 1, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1600 includes one or more offload cards 1670 (including one or more processors 1675, and possibly including the one or more network interfaces 1640) that are connected using an I/O interface 1630 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1600 may act as a host electronic device (e.g., operating as part of a hardware virtualization service) that hosts compute instances, and the one or more offload cards 1670 execute a virtualization manager that can manage compute instances that execute on the host electronic device. As an example, in some embodiments the offload card(s) 1670 can perform compute instance management operations such as pausing and/or un-pausing compute instances, launching and/or terminating compute instances, performing memory transfer/copying operations, etc. These management operations may, in some embodiments, be performed by the offload card(s) 1670 in coordination with a hypervisor (e.g., upon a request from a hypervisor) that is executed by the other processors 1610A-1610N of the computer system 1600. However, in some embodiments the virtualization manager implemented by the offload card(s) 1670 can accommodate requests from other entities (e.g., from compute instances themselves), and may not coordinate with (or service) any separate hypervisor.

In some embodiments, system memory 1620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Figure 17:
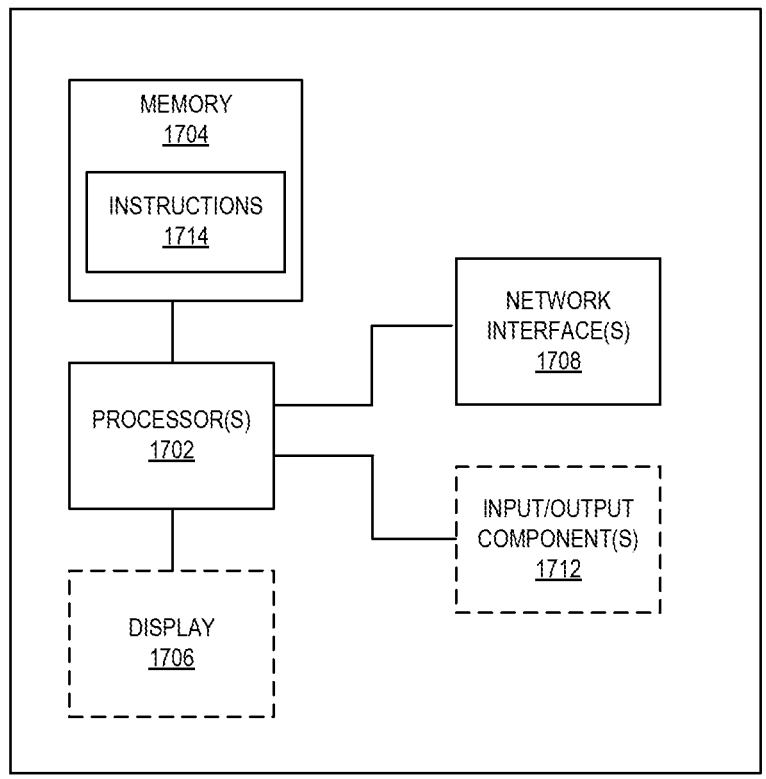
FIG. 17 illustrates a logical arrangement of a set of general components of an exemplary computing device that can be utilized in accordance with various embodiments.

FIG. 17 illustrates a logical arrangement of a set of general components of an example computing device 1700 such as a host, etc. Generally, a computing device 1700 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1702 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1704) to store code (e.g., instructions 1714) and/or data, and a set of one or more wired or wireless network interfaces 1708 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1704) of a given electronic device typically stores code (e.g., instructions 1714) for execution on the set of one or more processors 1702 of that electronic device. One or more parts of various embodiments may be implemented using different combinations of software, firmware, and/or hardware.

A computing device 1700 can include some type of display element 1706, such as a touch screen or liquid crystal display (LCD), although many devices such as portable media players might convey information via other means, such as through audio speakers, and other types of devices such as server end stations may not have a display element 1706 at all. As discussed, some computing devices used in some embodiments include at least one input and/or output component(s) 1712 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 18:
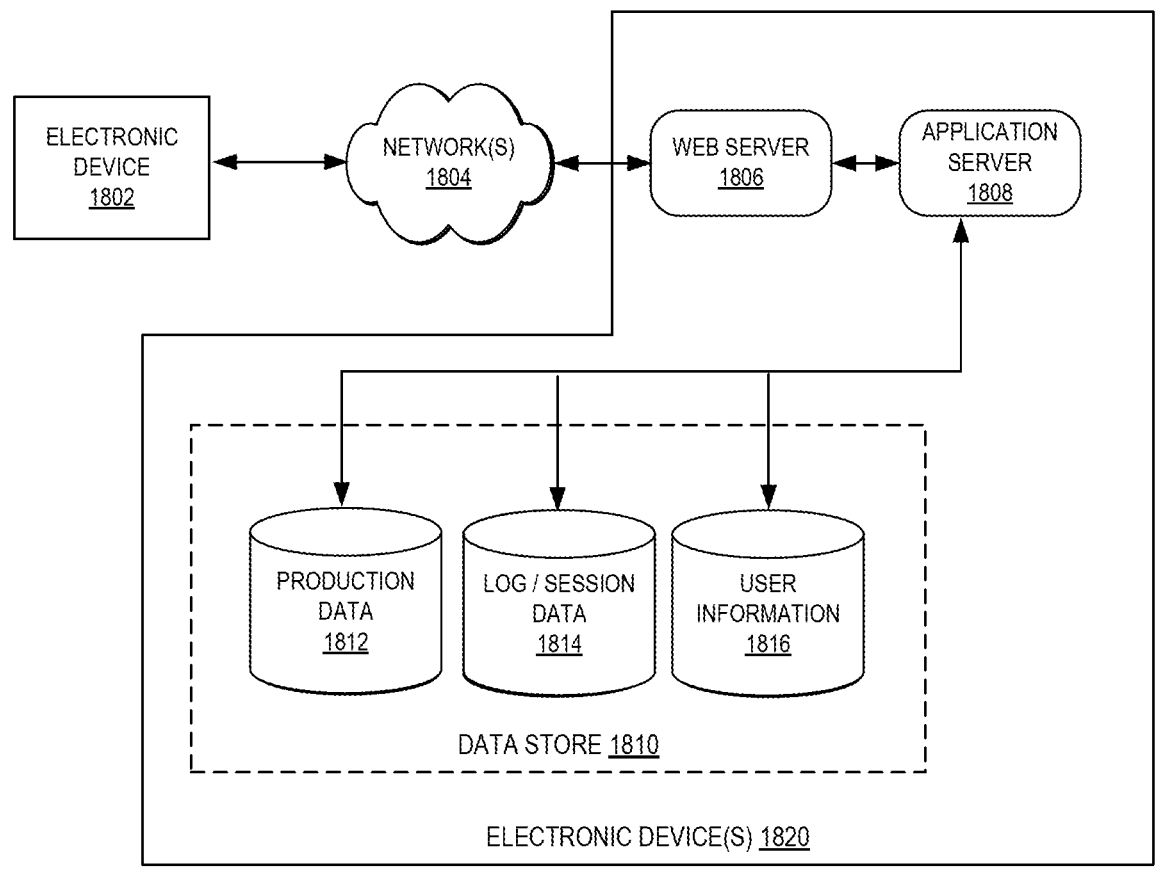
FIG. 18 illustrates an example of an environment for implementing aspects in accordance with various embodiments.

As discussed, different approaches can be implemented in various environments in accordance with the described embodiments. For example, FIG. 18 illustrates an example of an environment 1800 for implementing aspects in accordance with various embodiments. For example, in some embodiments inference requests are HyperText Transfer Protocol (HTTP) requests that are received by a web server (e.g., web server 1806), and the users, via electronic devices, may interact with the provider network via a web portal provided via the web server 1806 and application server 1808. As will be appreciated, although a web-based environment is used for purposes of explanation, different environments may be used, as appropriate, to implement various embodiments. The system includes an electronic client device 1802, which may also be referred to as a client device and can be any appropriate device operable to send and receive requests, messages or information over an appropriate network 1804 and convey information back to a user of the device 1802. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1804 includes the Internet, as the environment includes a web server 1806 for receiving requests and serving content in response thereto, although for other networks an alternative device serving a similar purpose could be used, as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1808 can include any appropriate hardware and software for integrating with the data store 1810 as needed to execute aspects of one or more applications for the client device 1802 and handling a majority of the data access and business logic for an application. The application server 1808 provides access control services in cooperation with the data store 1810 and is able to generate content such as text, graphics, audio, video, etc., to be transferred to the client device 1802, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1802 and the application server 1808, can be handled by the web server 1806. It should be understood that the web server 1806 and application server 1808 are not required and are merely example components, as structured code discussed herein can be executed on any appropriate device or host machine as discussed elsewhere herein.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store 1810 also is shown to include a mechanism for storing log or session data 1814. It should be understood that there can be many other aspects that may need to be stored in the data store, such as page image information and access rights information, which can be stored in any of the above listed mechanisms as appropriate or in additional mechanisms in the data store 1810. The data store 1810 is operable, through logic associated therewith, to receive instructions from the application server 1808 and obtain, update, or otherwise process data in response thereto. In one example, a user might submit a search request for a certain type of item. In this case, the data store 1810 might access the user information 1816 to verify the identity of the user and can access a production data 1812 to obtain information about items of that type. The information can then be returned to the user, such as in a listing of results on a web page that the user is able to view via a browser on the user device 1802. Information for a particular item of interest can be viewed in a dedicated page or window of the browser.

The web server 1806, application server 1808, and/or data store 1810 may be implemented by one or more electronic devices 1820, which can also be referred to as electronic server devices or server end stations, and may or may not be located in different geographic locations. Each of the one or more electronic devices 1820 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the environment 1800 in FIG. 18 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, from a bot, a request to analyze an utterance using a particular machine learning model, the utterance being a user input into the bot;
determining, with a router, a first inference service group (ISG) from among a plurality of ISGs to route the utterance to, wherein the first ISG comprises a plurality of hosts, wherein virtual machines are instantiated on slots on the plurality of hosts, wherein the plurality of hosts of the first ISG serves a same set of machine learning models, and wherein a number of the plurality of hosts of the first ISG is scaled based on throughput of the sets of machine learning models it hosts;

determining that a first metric exceeds a first threshold and a second metric exceeds a second threshold, wherein the first metric is a cache miss rate of the plurality of hosts of the first ISG over a time period, and wherein the second metric is a number of unique machine learning models requested in the first ISG over the time period;

responsive to determining that the first metric exceeds the first threshold and the second metric exceeds the second threshold:
  determining that the first ISG is overloaded; and
  creating a new ISG comprising a plurality of hosts, wherein the new ISG hosts the same set of machine learning models as the first ISG, and wherein the new ISG includes the particular machine learning model;
  determining, using a load balancer, a particular host of the new ISG to perform an analysis of the utterance, the particular host including the particular machine learning model in memory;
  determining a path to the particular host of the new ISG;
  sending, to the load balancer, the utterance and the path;
  routing the utterance to the particular host of the new ISG using the path;
  analyzing the utterance using the particular machine learning model of the particular host; and
  providing a result of the analyzing the utterance to the bot.

2. The computer-implemented method of claim 1, further comprising the first ISG adding hosts, or additional ISGs being spun up, in response to an increase in traffic among the plurality of ISGs.

3. The computer-implemented method of claim 1, wherein each host of the first ISG caches a first plurality of machine learning models loaded in random access memory and caches a second, different plurality of machine learning models according to a least frequently used caching model in disk.

4. A computer-implemented method comprising:
  receiving a request to perform an inference using a particular machine learning model;
  determining a first inference service group (ISG) from among a plurality of ISGs to route the request to, wherein the first ISG comprises a plurality of hosts, wherein virtual machines are instantiated on slots on the plurality of hosts, wherein the plurality of hosts of the first ISG serves a same set of machine learning models, and wherein a number of the plurality of hosts of the first ISG is scaled based on throughput of the sets of machine learning models it hosts;
  determining that a first metric exceeds a first threshold and a second metric exceeds a second threshold, wherein the first metric is a cache miss rate of the plurality of hosts of the first ISG over a time period, and wherein the second metric is a number of unique machine learning models requested in the first ISG over the time period;
  responsive to determining that the first metric exceeds the first threshold and the second metric exceeds the second threshold:
    determining that the first ISG is overloaded; and
    creating a new ISG comprising a plurality of hosts, wherein the new ISG hosts the same set of machine learning models as the first ISG, and wherein the new ISG includes the particular machine learning model;
    determining a particular host of the new ISG to perform an analysis of the request, the particular host including the particular machine learning model in memory;
    determining a path to the particular host of the new ISG;
    routing the request to the particular host of the new ISG using the path;
    performing inference on the request using the particular machine learning model of the particular host; and
    providing a result of the inference to a requester.

5. The computer-implemented method of claim 4, wherein each host maps to at least one virtual node and an identifier of the particular machine learning model is hashed to at least one of the virtual nodes.

6. The computer-implemented method of claim 5, wherein which host to route to is randomly determined and a location of the host to route to dictates the first ISG to route the request to.

7. The computer-implemented method of claim 4, further comprising the first ISG adding hosts, or additional ISGs being spun up, in response to an increase in traffic among the plurality of ISGs.

8. The computer-implemented method of claim 4, further comprising:
  generating an indication to create the new ISG to host machine learning models of the first ISG; and
  providing the indication to a monitoring service.

9. The computer-implemented method of claim 4, wherein the request and the path are routed according to listener rules.

10. The computer-implemented method of claim 4, wherein each host of the first ISG caches a first plurality of machine learning models loaded in random access memory and caches a second, different plurality of machine learning models according to a least frequently used caching model in disk.

11. The computer-implemented method of claim 4, further comprising:
  storing data including the request and the result of the inference in a data hub accessible to a subscribing entity.

12. The computer-implemented method of claim 4, wherein the request is received from a bot.

13. A system comprising:
  one or more non-transitory storage devices storing one or more machine learning models used by an inference service; and
  the inference service including a plurality of hosts implemented by a first one or more electronic devices, the inference service including one or more processors and non-transitory memory storing instructions that, upon execution by the one or more processors, cause the inference service to:
    receive a request to perform an inference using a particular machine learning model;
    determine a first inference service group (ISG) from among a plurality of ISGs to route the request to, wherein the first ISG comprises a plurality of hosts, wherein virtual machines are instantiated on slots on the plurality of hosts, wherein the plurality of hosts of the first ISG serves a same set of machine learning models, and wherein a number of the plurality of hosts of the first ISG is scaled based on throughput of the sets of machine learning models it hosts;
    determine that a first metric exceeds a first threshold and a second metric exceeds a second threshold, wherein the first metric is a cache miss rate of the plurality of hosts of the first ISG over a time period, and wherein the second metric is a number of unique machine learning models requested in the first ISG over the time period;
responsive to determining that the first metric exceeds the first threshold and the second metric exceeds the second threshold:
  determining that the first ISG is overloaded; and
  creating a new ISG comprising a plurality of hosts, wherein the new ISG hosts the same set of machine learning models as the first ISG, and wherein the new ISG includes the particular machine learning model;
determine a particular host of the new ISG to perform an analysis of the request, the particular host including the particular machine learning model in memory;
determine a path to the particular host of the new ISG;
route the request to the particular host of the new ISG using the path;
perform inference on the request using the particular machine learning model of the particular host; and
provide a result of the inference to a requester.

14. The system of claim 13, wherein each host maps to at least one virtual node and an identifier of the particular machine learning model is hashed to at least one of the virtual nodes.

15. The system of claim 14, wherein which host to route to is randomly determined and a location of the host to route to dictates the first ISG to route the request to.

16. The system of claim 13, wherein the non-transitory memory stores further instructions that, upon execution by the one or more processors, further cause the inference service to add hosts to the first ISG, or spin up additional ISGs, in response to an increase in traffic among the plurality of ISGs.

17. The system of claim 13, wherein the non-transitory memory stores further instructions that, upon execution by the one or more processors, further cause the inference service to:
  generate an indication to create the new ISG to host machine learning models of the first ISG; and
  provide the indication to a monitoring service.

18. The system of claim 13, wherein each host of the first ISG caches a first plurality of machine learning models loaded in random access memory and caches a second, different plurality of machine learning models according to a least frequently used caching model in disk.

19. The system of claim 13, wherein the non-transitory memory stores further instructions that, upon execution by the one or more processors, further cause the inference service to store data including the request and the result of the inference in a data hub accessible to a subscribing entity.

20. The system of claim 13, wherein the request is received from a bot.

* * * * *